(12) United States Patent
Thornton

(10) Patent No.: US 11,233,595 B2
(45) Date of Patent: Jan. 25, 2022

(54) METHOD FOR DETECTING BASE STATIONS USING A SEARCH DEVICE AS WELL AS SEARCH DEVICE

(71) Applicant: Rohde & Schwarz GmbH & Co. KG, Munich (DE)

(72) Inventor: Jeffrey Thornton, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 117 days.

(21) Appl. No.: 16/839,415

(22) Filed: Apr. 3, 2020

(65) Prior Publication Data
US 2021/0314079 A1 Oct. 7, 2021

(51) Int. Cl.
*H04J 11/00* (2006.01)
*H04W 72/04* (2009.01)
*H04W 4/80* (2018.01)

(52) U.S. Cl.
CPC ....... *H04J 11/0073* (2013.01); *H04J 11/0076* (2013.01); *H04W 4/80* (2018.02); *H04W 72/0446* (2013.01)

(58) Field of Classification Search
None
See application file for complete search history.

(56) References Cited

U.S. PATENT DOCUMENTS

| 9,277,519 | B1 | 3/2016 | Pu et al. | |
|---|---|---|---|---|
| 10,285,144 | B2* | 5/2019 | Lei | H04L 5/0048 |
| 10,455,485 | B2* | 10/2019 | Abedini | H04J 11/0086 |
| 10,999,811 | B2* | 5/2021 | Lee | H04W 4/80 |
| 2020/0358501 | A1* | 11/2020 | Hormis | H04W 56/001 |

FOREIGN PATENT DOCUMENTS

| EP | 3057252 A1 | 8/2016 |
|---|---|---|
| JP | 2016-129434 A | 7/2016 |

* cited by examiner

*Primary Examiner* — Tri H Phan
(74) *Attorney, Agent, or Firm* — Christensen O'Connor Johnson Kindess PLLC

(57) ABSTRACT

A method for detecting base stations is shown comprising steps of determining an assumed primary synchronization signal with the strongest peak in a signal set; finding an associated secondary synchronization signal; shifting the assumed primary synchronization signal and the secondary synchronization signal at the same point and time; subtracting the signals from one another obtaining a residual signal; and determining whether a peak of the residual signal is present which is larger than a predetermined threshold. Further, a search device is shown.

18 Claims, 2 Drawing Sheets

METHOD FOR DETECTING BASE STATIONS USING A SEARCH DEVICE AS WELL AS SEARCH DEVICE

FIELD OF THE DISCLOSURE

The disclosure relates to a method for detecting base stations using a search device as well as a search device.

BACKGROUND

In densely clustered wireless networks, like narrow band internet of things cellular networks (NB-IoT networks) it is a difficult task to identify all base stations with certainty.

Known schemes for finding all base stations, for example in LTE cellular networks, are not efficient and have difficulties with NB-IoT networks due to a relatively large time gap between the primary synchronization signal and the secondary synchronization signal in such NB-IoT networks.

Thus, there is a need to provide an improved method for detecting base stations using a search device.

SUMMARY

To address this need or others, a method for detecting base stations using a search device is suggested. In an embodiment, the method comprises the following steps:

receiving a signal set of primary synchronization signals within a predefined time frame;

determining an assumed primary synchronization signal of the detected primary synchronization signals with strongest peak;

determining a secondary search interval at a predefined temporal distance from the strongest peak;

detecting a secondary synchronization signal in the secondary search interval;

determining power and time of the assumed primary synchronization signal and secondary synchronization signal;

shifting the assumed primary synchronization signal towards the secondary synchronization signal or shifting the secondary synchronization signal towards the assumed primary synchronization signal by the time difference between the assumed primary and the secondary synchronization signal;

after shifting, subtracting the secondary synchronization signal from the assumed primary synchronization signal, obtaining a residual signal;

determining whether a peak of the residual signal exceeds a predetermined threshold; and determining that a primary synchronization signal of at least one further base station is present at the time of the assumed primary synchronization signal associated with the peak of the residual signal.

By comparing the assumed primary synchronization signal, i.e. what is believed to be a single primary synchronization signal, against a detected secondary synchronization signal it can be determined if the assumed primary synchronization signal contains significantly more power than the associated secondary synchronization signal. If so, it is highly likely that the assumed primary synchronised signal, i.e. signal interpreted as a single primary synchronization signal, actually is due to more than one primary synchronization signal. This way, base stations that might have gone undetected can be specifically searched for.

Most or all steps of the method are performed by the search device, for example a control unit or control circuit of the search device.

The search interval may lie within the time frame, i.e. it may be a subinterval of the time frame.

The determination of power and time may be performed at the time of the detection of the respective signal or at a later point in time.

In an aspect, the assumed primary synchronization signal and the secondary synchronization signal are subtracted by inverting the amplitude of the assumed primary and/or the secondary synchronization signal and overlaying the obtained signals, to achieve a reliable cancellation of the signals.

In order to improve the accuracy of a potential peak, a filter may be applied to the assumed primary synchronization signal and/or the detected secondary synchronization signal before subtraction. The filter may be a Gaussian Kernel, for example.

In an embodiment, the method further comprises the steps of:

removing the detected secondary synchronization signal and the assumed primary synchronization signal with strongest peak from the measured signal set, obtaining a reduced signal set;

repeating the steps of determining an assumed primary synchronization signal with the strongest peak, determining a search interval, detecting a secondary signal and removing signals on the reduced signal set until no primary synchronization signal can be found in the reduced signal set anymore;

shifting the assumed primary synchronization signals towards the detected secondary synchronization signals or shifting the detected secondary synchronization signals towards the assumed primary synchronization signals by the time difference between the assumed primary and the secondary synchronization signals; and after shifting, subtracting the secondary synchronization signals from the assumed primary synchronization signals, obtaining the residual signal.

This way, a reliable and complete scheme for detecting all base stations is provided.

The assumed primary synchronization signals and the secondary synchronization signals may be subtracted easily by inverting the amplitude the assumed primary or the secondary synchronization signals and overlaying the obtained signals.

Similarly as explained before, a filter, for example a Gaussian Kernel, is applied to at least one of the assumed primary synchronization signals and/or at least one of the detected secondary synchronization signals before subtraction.

To facilitate removing the signals, an inverse signal of the detected secondary synchronization signal and the assumed primary synchronization signal to be removed is created and added to the signal set.

In order to be able to use the removed signals at a later point in time, the removed assumed primary and secondary synchronizations signals are stored in a memory of the search device.

For improved signal processing, the signal set may be an IQ-data set, for example. In an aspect, the base stations are NB-IoT base stations, thus providing a reliable scheme to detected NB-IoT base stations.

For example, the search device is at least one of an NB-IoT scanner, a user equipment and a NB-IoT device.

In an aspect, the predefined time frame is a time frame in a radio frame; time frame in a subframe of the radio frame, for example in the first subframe of the radio frame; and/or a time frame in a time slot of the subframe, for example in the first time slot. By precisely defining the time frame, performance of the method is improved.

To further improve the performance, the time frame may have a length between 150 ms and 250 ms, for example of 200 ms.

Performance may also be improved by using a predefined temporal distance having a length between 3 ms and 5 ms, for example of 4 ms.

In an aspect, the secondary search interval lies temporally behind the strongest peak, spaced apart by the predefined temporal distance.

For above need, further a search device for detecting base stations is provided. The search device comprises a control unit and a signal input for receiving measured signal sets and/or signal to form a signal set, the control unit being configured to perform the following steps:

receiving a signal set of primary synchronization signals within a predefined time frame;

determining an assumed primary synchronization signal of the detected primary synchronization signals with strongest peak;

determining a secondary search interval at a predefined temporal distance from the strongest peak;

detecting a secondary synchronization signal in the secondary search interval;

determining power and time of the assumed primary synchronization signal and secondary synchronization signal;

shifting the assumed primary synchronization signal towards the secondary synchronization signal or shifting the secondary synchronization signal towards the assumed primary synchronization signal by the time difference between the assumed primary and the secondary synchronization signal;

after shifting, subtracting the secondary synchronization signal from the assumed primary synchronization signal, obtaining a residual signal;

determining whether a peak of the residual signal exceeds a predetermined threshold; and determining that a primary synchronization signal of at least one further base station is present at the time of the assumed primary synchronization signal associated with the peak of the residual signal.

The features and advantages of the method apply to the search device as well and vice versa.

The search device may be an NB-IoT scanner and/or a user equipment and/or an NB-IoT device.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
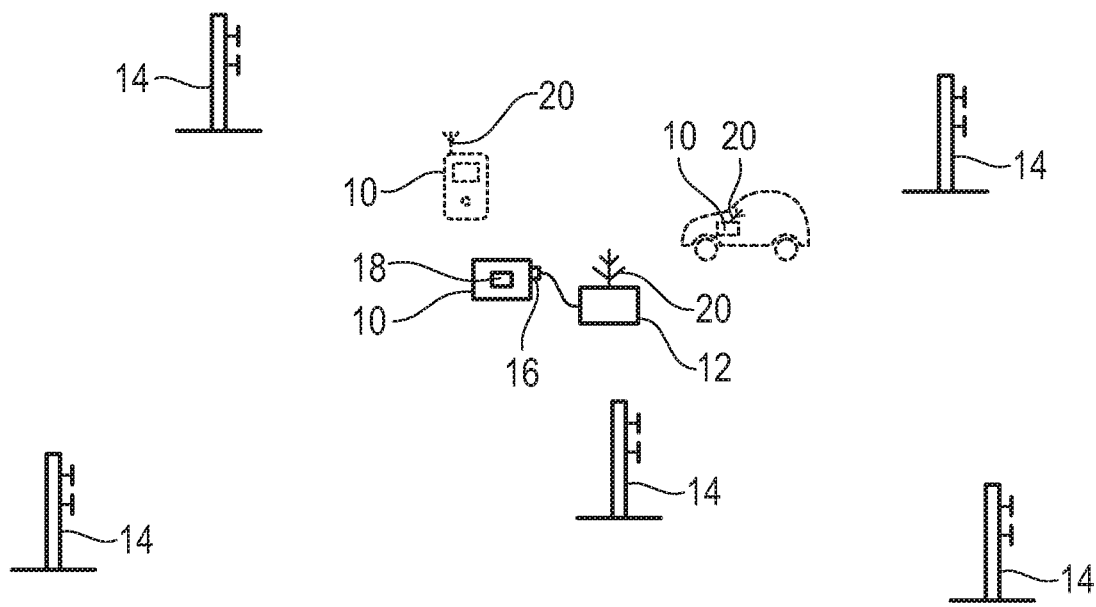
FIG. 1 shows a search device according to an embodiment of the disclosure in a scenario with several base stations.

FIG. 1 shows a search device 10, a radio frequency receiver 12 and several base stations 14. The base stations 14 are for example narrow band internet of things (NB-IoT) base stations. The base stations 14 are located around the search device 10. The radio frequency receiver 12 comprises an antenna for receiving radio frequency signals emitted by the base stations 14.

In an embodiment, the search device 10 may be a scanner for NB-IoT base stations, i.e. an NB-IoT scanner. The search device 10 comprises a signal input 16 connected to the radio frequency device and a control circuit(s) or unit 18. The search device 10 may also be a user equipment or an NB-IoT device, for example of a vehicle, as illustrated by dash lines in FIG. 1. The user equipment and/or the NB-IoT device in the vehicle, but also the scanner may comprise an antenna 20 as a signal input 16 for receiving signals to generate a signal set S.

Base stations 14 broadcast periodically synchronization signals to a device synchronizing connect with the respective base station 14. According to the LTE standard the NB-IoT standard and the 5G standard, a pair of synchronization signals, namely a primary synchronization signal PSS and a secondary synchronization signal SSS are broadcasted by the base station.

In scenarios with many base stations 14, like the one shown in FIG. 1, the synchronization signals, such as primary synchronization signal PSS and secondary synchronization signal SSS, overlap with one another so that detecting all base stations is difficult.

Figure 2:
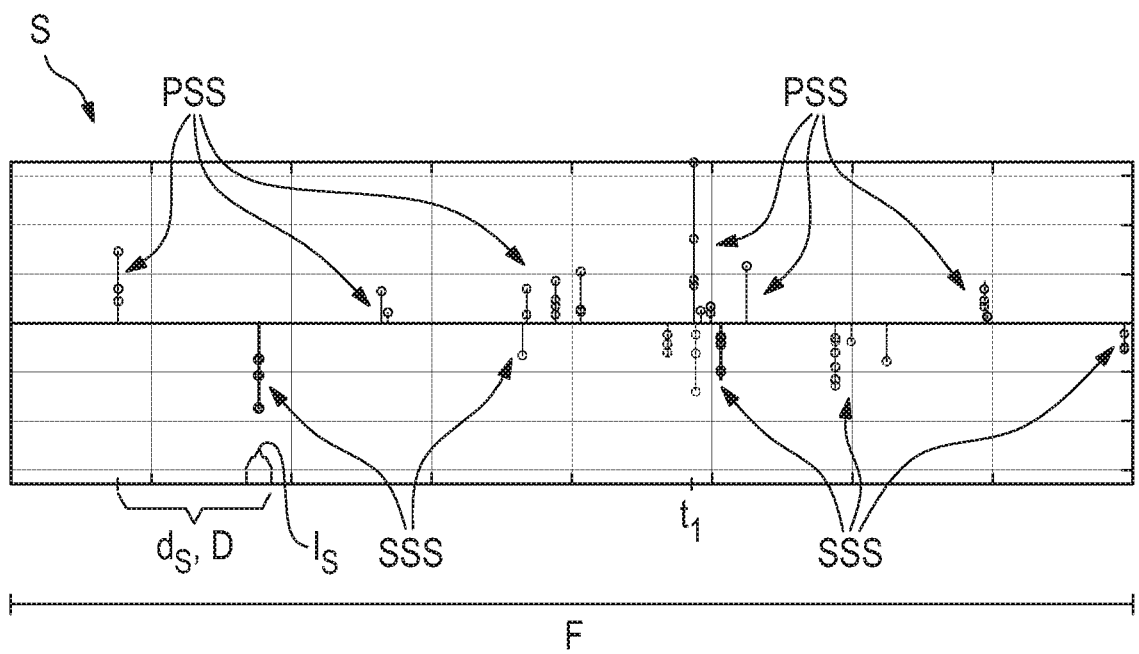
FIG. 2 shows a signal set received by the search device.

FIG. 2 shows an example of a signal set S received by the search device 10. The signal set S may be measured by the radio frequency receiver 12 and transmitted to the search device 10 via the signal input 16 or measured by the search device 10 directly using an antenna 20. In some embodiments, the signal set S includes several primary synchronization signals PSS and respective secondary synchronization signals SSS.

For illustration purposes only, FIG. 2 shows the positive amplitudes of the primary synchronization signals PSS upwards and the positive amplitude of the secondary synchronization signals SSS downwards with respect to the time access. In the example shown in FIG. 2, at time $t_1$, several primary synchronization signals PSS and secondary synchronization signals SSS appear at the same time or in short succession.

Even though FIG. 2 shows an amplitude over time graph for illustration purposes, the signal set S may be an IQ-data set of the primary and secondary synchronization signals PSS, SSS, for example.

The signals set S spans over a predefined time frame F, i.e. a time frame having a duration being defined before the measurement. The time frame F, i.e. the duration may depend on the communication standard used by the search device 10 and the base stations 14 and is, for example, a time interval in a first time slot of a first sub frame of a radio frame of the respective communication standard. In some embodiments, the time frame F may be between 150 milliseconds onto 250 milliseconds long, for example 200 milliseconds.

The communication standards used by the search device 10 and the base stations 14 for communication also defines the time interval between a primary synchronization signal PSS and the corresponding secondary synchronization signal of the same base station 14. In some embodiments, this distance may be 3 to 5 milliseconds, for example 4 milliseconds.

Figure 3:
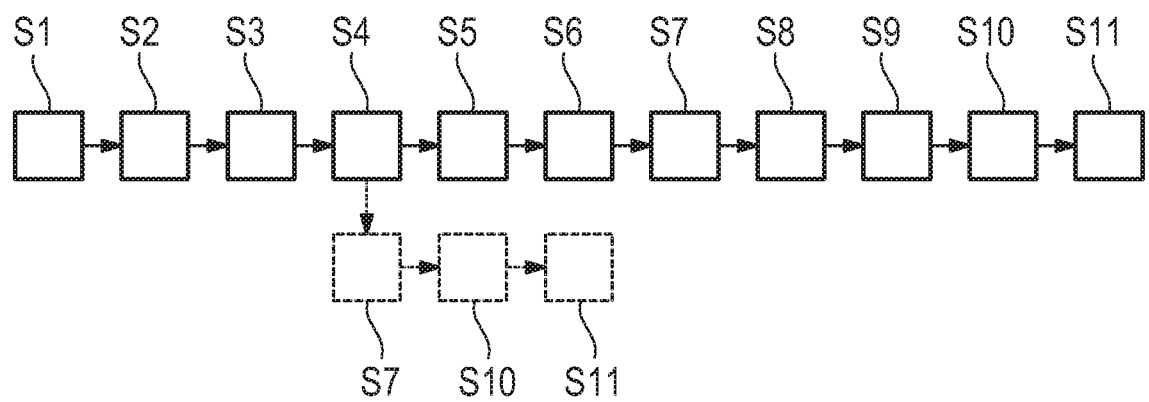
FIG. 3 shows a flowchart of a method according to an embodiment of the disclosure.

In order to detect all base stations 14, i.e. to detect all primary and secondary synchronization signals PSS, SSS of the base stations 14, the control unit 18 of the search device 10 performs, for example, the method illustrated in FIG. 3.

In a first step S1, the search device 10, for example the control unit 18, receives the signals set S of primary synchronization signals PSS and secondary synchronization signals SSS. For example, the signal set S has been measured by the radio frequency receiver 12 and transmitted to the search device 10 via the signal input 16. Alternatively or in addition, the search device 10 may have captured the signals set S itself, for example using an antenna 20 connected to the signal input 16.

The primary synchronization signals PSS and the secondary synchronization signals SSS comprised in the signals set S have been captured within the time frame F that has been predefined.

In the next step S2, the control unit 18 determines an assumed primary synchronization signal in the signal set S having the highest amplitude, i.e. the strongest peak. The control unit 18 searches for the highest peak in a per se known manner and assumes that the signal causing the peak is a single primary synchronization signal PSS. However, the signal causing the peak may also be more than one primary synchronization signal PSS occurring simultaneously.

Then, in step S3 a secondary search interval $I_s$ is defined as an interval of a predefined duration $d_s$, being for example one millisecond. The secondary search interval $I_s$ lies within the predefined time frame F.

The secondary search interval $I_s$ is chosen such that it has a temporal distance D from, for example after, the point in time of the peak of the assumed primary synchronization signal PSS with the strongest peak that has been determined in step S2. The temporal distance D is predefined and is for example the same as the temporal distance between the primary synchronization signal PSS and the secondary synchronization signal SSS defined in the communication standard used. For example, the predefined temporal distance D may be between 3 and 5 milliseconds, for example 4 milliseconds.

In step S4, a secondary synchronization signal is searched for in the secondary search interval $I_s$.

The assumed primary synchronization signal PSS and an associated secondary synchronization signal SSS that has been detected in the corresponding secondary search interval $I_s$ are then stored in a memory of the control unit 18 for further use.

It is worth noting that the secondary synchronization signal SSS does not necessarily have to be the secondary synchronization signal SSS actually corresponding to the primary synchronization signal with the strongest peak. The detection of the secondary synchronization signal SSS is performed indiscriminately of the primary synchronization signal PSS.

In step S6, the detected secondary synchronization signal SSS and the assumed primary synchronization signal PSS with the strongest peak are then deleted from the signal set S. The assumed primary synchronization signal PSS and the secondary synchronization signal SSS are removed from the signal set S or the respective reduced signal set S by creating the inverse signals of the signals to be removed and adding them to the signal set. This may be done, for example, if the signal set S comprises IQ-data of the signals.

The assumed primary synchronization signal PSS and its corresponding secondary synchronization signal SSS of the same base station 14 may then be used to identify the respective base station 14.

The signal set S containing the remaining signals is called a reduced signal set in the following.

Steps S2 to S6 are then repeated several times. With each repetition, one assumed primary synchronization signal PSS and a secondary synchronization signal SSS are deleted from the reduced signal set until the reduced signal set does not contain any primary synchronization signal anymore.

Figure 4:
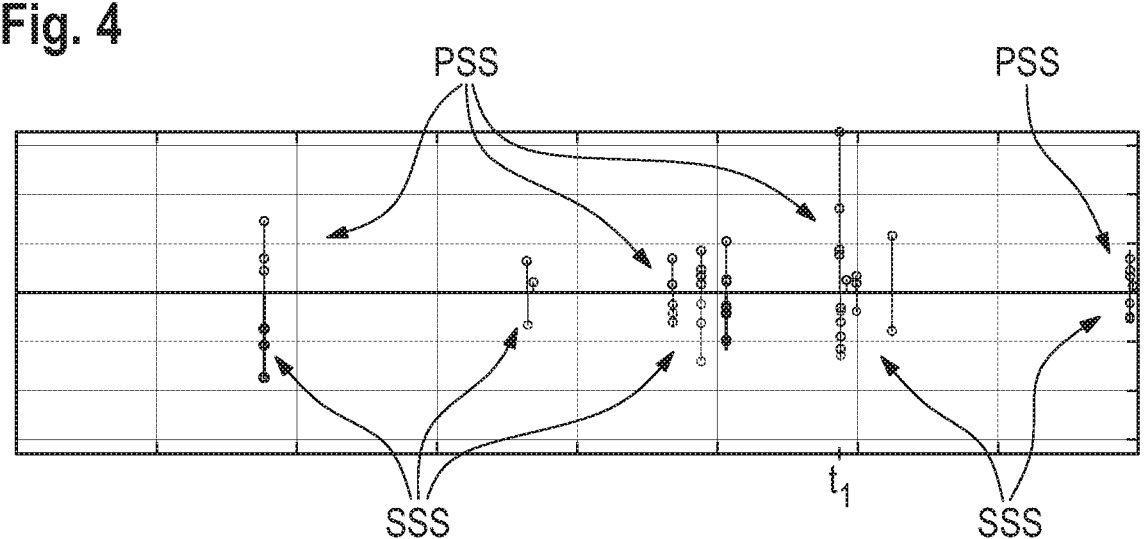
FIG. 4 shows the signal set of FIG. 2 after shifting the assumed primary synchronization signals and the secondary synchronization signals with respect to each other.

Then, in step S7, the removed assumed primary synchronization signals PSS and secondary synchronization signals SSS are used as follows. In the time domain, the assumed primary synchronization signals PSS are shifted relative to the secondary synchronization signals SSS so that the assumed primary synchronization signals and the secondary synchronization signals that have been removed in the same repetition of steps S2 to S6 are at the same point in time. This may be done by shifting the assumed primary synchronization signals PSS or the secondary synchronization signals SSS. For example, the magnitude of the shift is exactly the predefined temporal distance D. A signal set with shifted assumed primary synchronization signals PSS and secondary synchronization signals SSS is shown in FIG. 4.

Then, in step S8, a filter, for example a Gaussian Kernel is applied to the assumed primary synchronization signals PSS and the secondary synchronization signals SSS to improve the quality of the signals and remove or flatten out errors.

In step S9, the filtered primary and secondary synchronization signals PSS, SSS are subtracted from one another, for example by inverting the amplitude of the secondary synchronization signals SSS and overlaying them with the primary synchronization signals PSS, or vice versa.

Figure 5:
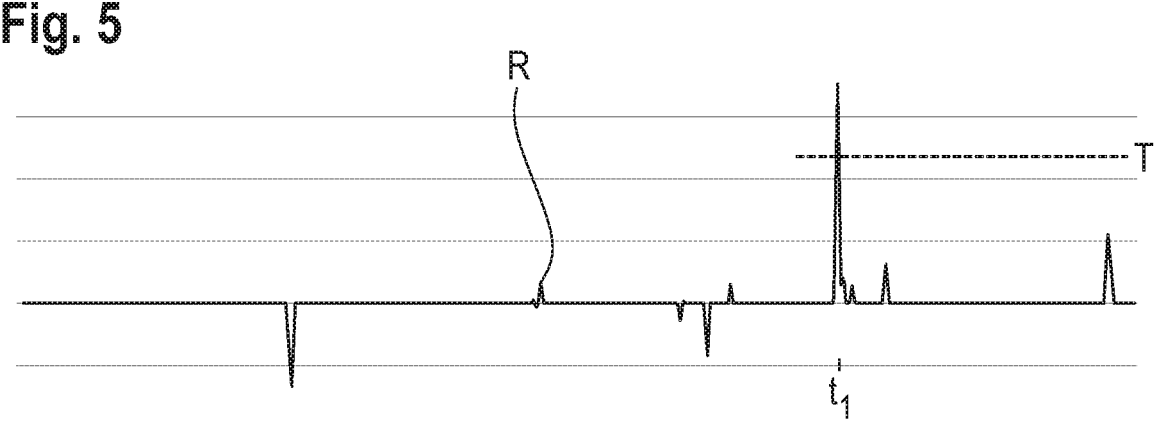
FIG. 5 shows an overlay of the signals of the signal set according to FIG. 4.

The signal received is a residual signal R as shown in FIG. 5. In Step S10, the residual signal R is analysed by the control unit 18 to determine whether a peak or more than one peak of the residual signal R exceeds a predetermined threshold T. In the shown embodiment, this is the case at time $t_1$.

The peak in the residual signal R arises because in one of the repetitions of Step S2 during the determination of assumed primary synchronization signals PSS, a sum of several primary synchronization signals PSS has been mistakenly interpreted as the assumed primary synchronization signal, i.e. as a single primary synchronization signal. Thus, not only one but several primary synchronization signals PSS has been removed in a single repetition entirely.

However, in this repetition, only one secondary synchronization signal has been deleted, leaving a spare secondary synchronization signal SSS in the reduced signal set. Thus, a secondary synchronization signal SSS remains in the reduced signal set S even though no primary synchronization signal PSS are present in the reduced signal set S anymore.

As this remaining secondary synchronization signal SSS has not been removed, is not regarded for the determination of the residual signal. Thus, at the time $t_1$, two primary synchronization signals PSS are present but only one secondary synchronization signal SSS so that the primary synchronization signals PSS, secondary synchronization signals SSS do not cancel out fully, leading to the peak in the residual signal R.

In step S11 it is determined that another primary synchronization signal PSS has to be present at the time $t_1$, namely the time of the assumed primary synchronization signal PSS associated with the peak of the residual signal R. Thus, the signal set S may be analysed for another primary synchronization signal at time $t_1$ to identify this further base station 14. This way, even in highly dense environments, all base stations 14 can be detected efficiently.

It is possible that in situations with fewer base stations 14 the method may be simplified. In this case (shown in dashed lines in FIG. 3), the assumed primary synchronization signal PSS and the secondary synchronization signal SSS found in the secondary search interval $I_s$ are subtracted from one another (similar to step S7) right after the second synchronization signal SSS has been detected, i.e. right after step S5.

Then, steps S10 and S11 may be performed with only the two signals, namely the assumed primary synchronization signals PSS and the secondary synchronization signal SSS to determine whether or not multiple assumed primary synchronization signals PSS have been mistakenly interpreted as a single one. In this case, it is not strictly necessary to remove the signals from the signal set S.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method for detecting base stations using a search device comprising:
   receiving a signal set of primary synchronization signals within a predefined time frame;
   determining an assumed primary synchronization signal of the detected primary synchronization signals with strongest peak;
   determining a secondary search interval at a predefined temporal distance from the strongest peak;
   detecting a secondary synchronization signal in the secondary search interval,
   determining power and time of the assumed primary synchronization signal and secondary synchronization signal;
   shifting the assumed primary synchronization signal towards the secondary synchronization signal or shifting the secondary synchronization signal towards the assumed primary synchronization signal by the time difference between the assumed primary and the secondary synchronization signal;
   after shifting, subtracting the secondary synchronization signal from the assumed primary synchronization signal, obtaining a residual signal;
   determining whether a peak of the residual signal exceeds a predetermined threshold; and
   determining that a primary synchronization signal of at least one further base station is present at the time of the assumed primary synchronization signal associated with the peak of the residual signal.

2. The method according to claim 1, wherein the assumed primary synchronization signal and the secondary synchronization signal are subtracted by inverting the amplitude of one of the primary and the secondary synchronization signal and overlaying the obtained signals.

3. The method according to claim 1, wherein a filter is applied to at least one of the assumed primary synchronization signal and the detected secondary synchronization signal before subtraction.

4. The method according to claim 3, wherein the filter is a Gaussian Kernel.

5. The method according to claim 1, further comprising:
removing the detected secondary synchronization signal and the assumed primary synchronization signal with strongest peak from the measured signal set, obtaining a reduced signal set;
repeating the steps of determining an assumed primary synchronization signal with the strongest peak, determining a search interval, detecting a secondary signal and removing signals on the reduced signal set until no primary synchronization signal can be found in the reduced signal set anymore;
shifting the assumed primary synchronization signals towards the detected secondary synchronization signals or shifting the detected secondary synchronization signals towards the assumed primary synchronization signals by the time difference between the assumed primary and the secondary synchronization signals; and
after shifting, subtracting the secondary synchronization signals from the assumed primary synchronization signals, obtaining the residual signal.

6. The method according to claim 5, wherein an inverse signal of the detected secondary synchronization signal and the assumed primary synchronization signal to be removed is created and added to the signal set.

7. The method according to claim 5, wherein the removed assumed primary and secondary synchronizations signals are stored in a memory of the search device.

8. The method according to claim 1, wherein the signal set is an IQ-data set.

9. The method according to claim 1, wherein the base stations are NB-IoT base stations.

10. The method according to claim 1, wherein the search device is at least one of an NB-IoT scanner, a user equipment and a NB-IoT device.

11. The method according to claim 1, wherein the predefined time frame is a time frame in a radio frame.

12. The method according to claim 11, wherein the predefined time frame is a time frame in a subframe of the radio frame.

13. The method according to claim 12, wherein the predefined time frame is a time frame in a time slot of the subframe.

14. The method according to claim 1, wherein the time frame has a length between 150 ms and 250 ms.

15. The method according to claim 1, wherein the predefined temporal distance has a length between 3 ms and 5 ms.

16. The method according to claim 1, wherein the secondary search interval lies the predefined temporal distance after the strongest peak.

17. A search device for detecting base stations, comprising:
one or more control circuits;
a signal input for receiving at least one of measured signal sets and signals to form a signal set,
wherein the one or more control circuits are configured to:
receive a signal set of primary synchronization signals within a predefined time frame;
determine an assumed primary synchronization signal with strongest peak of the detected primary synchronization signals;
determine a secondary search interval at a predefined temporal distance from the strongest peak;
detect a secondary synchronization signal in the secondary search interval;
determine power and time of the assumed primary synchronization signal and secondary synchronization signal;
shift the assumed primary synchronization signal towards the secondary synchronization signal or shifting the secondary synchronization signal towards the assumed primary synchronization signal by the time difference between the assumed primary and the secondary synchronization signal;
after shifting, subtract the secondary synchronization signal from the assumed primary synchronization signal, obtaining a residual signal;
determine whether a peak of the residual signal exceeds a predetermined threshold; and
determine that a primary synchronization signal of at least one further base station is present at the time of the assumed primary synchronization signal associated with the peak of the residual signal.

18. The search device according to claim 17, wherein the search device is at least one of an NB-IoT scanner, a user equipment or an NB-IoT device.

* * * * *